US011323927B2

(12) United States Patent
Diggins et al.

(10) Patent No.: US 11,323,927 B2
(45) Date of Patent: May 3, 2022

(54) AUTOMATED OBSERVATIONAL PASSIVE INTERMODULATION (PIM) INTERFERENCE DETECTION IN CELLULAR NETWORKS

(71) Applicant: TELEFONAKTIEBOLAGET LM ERICSSON (PUBL), Stockholm (SE)

(72) Inventors: Mark Diggins, Dingley Village (AU); Adrian Scaringi, Melbourne (AU); Radek Wrzesinski, Melbourne (AU); Matthew Barker, Greensborough (AU); Conor Kelly, Melbourne (AU); Danielle Marie Ormandy, Melbourne (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/048,292

(22) PCT Filed: Apr. 20, 2018

(86) PCT No.: PCT/SE2018/050401
§ 371 (c)(1),
(2) Date: Oct. 16, 2020

(87) PCT Pub. No.: WO2019/203704
PCT Pub. Date: Oct. 24, 2019

(65) Prior Publication Data
US 2021/0160746 A1 May 27, 2021

(51) Int. Cl.
*H04W 36/00* (2009.01)
*H04W 24/08* (2009.01)

(52) U.S. Cl.
CPC ....... *H04W 36/0083* (2013.01); *H04W 24/08* (2013.01); *H04W 36/0061* (2013.01)

(58) Field of Classification Search
CPC ............. H04W 36/0083; H04W 24/08; H04W 36/0061
(Continued)

(56) References Cited

U.S. PATENT DOCUMENTS 9,668,268 B2   5/2017  Lindoff et al.
10,009,784 B1  6/2018  Evircan et al.
(Continued)

FOREIGN PATENT DOCUMENTS

WO    2017006155 A1    1/2017

OTHER PUBLICATIONS

International Search Report/Written Opinion dated Jan. 4, 2019 in related/corresponding PCT Application No. PCT/SE2018/050401.
(Continued)

*Primary Examiner* — Mong-Thuy T Tran
(74) *Attorney, Agent, or Firm* — Patent Portfolio Builders PLLC

(57) ABSTRACT

A method for determining whether a target cell has experienced interference due to Passive Intermodulation (PIM) distinguished from other forms of interference at cellular network sites during a time window. In one aspect, the method includes defining a set of N time slices and obtaining a first performance metric for each of the N time slices. The method includes selecting a subset of the N time slices using a set of N first performance metrics where the subset of N time slices includes a first time slice. For the first time slice, at least a first data point is determined using a performance metric for the target cell that was collected during the first time slice. The method includes using the first data point and a supervised learning model to determine whether the target cell has experience PIM interference during the time window.

20 Claims, 5 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2013/0322395 | A1* | 12/2013 | Kazmi | ................ H04W 72/082 |
| | | | | 370/329 |
| 2014/0153418 | A1 | 6/2014 | Hariharan et al. | |
| 2015/0350940 | A1* | 12/2015 | Wilson | ................. H04B 1/1027 |
| | | | | 370/252 |
| 2016/0366605 | A1* | 12/2016 | Tsui | ................... H04B 17/0085 |
| 2017/0064591 | A1* | 3/2017 | Padfield | ................ H04W 36/20 |
| 2017/0262781 | A1* | 9/2017 | Yang | ................ G06Q 10/06395 |
| 2017/0272319 | A1* | 9/2017 | Sheen | ................ H04W 24/02 |
| 2018/0070362 | A1* | 3/2018 | Ryan | ..................... H04L 41/142 |
| 2020/0037345 | A1* | 1/2020 | Ryoo | ................... H04W 76/10 |

OTHER PUBLICATIONS

R. Hartman et al., "PIM Test Power Levels For Mobile Communication Systems," Smiths Microwave, Kaelus, Mar. 2012, 7 pages.

* cited by examiner

AUTOMATED OBSERVATIONAL PASSIVE INTERMODULATION (PIM) INTERFERENCE DETECTION IN CELLULAR NETWORKS

TECHNICAL FIELD

Disclosed are embodiments related to detection of passive intermodulation (PIM) interference in cellular networks.

BACKGROUND

Passive Intermodulation (PIM) interference in a radio frequency (RF) uplink channel is a common problem in multi-technology and multi-band cellular networks. Rust, damaged cabling, faulty connectors, water ingress, external objects near the antenna, among other factors, may cause some harmonic components of the downlink transmitted signals to interfere with the uplink reception on the same or adjoining sectors. PIM interference can cause significant radio performance degradation that often goes undetected. While interference in the uplink of a cell is easy to determine, it is difficult to find the root cause of the interference. The actions to be taken to identify interference caused by PIM are different than other interference sources.

SUMMARY

There currently does not exist a method for identifying interference caused by PIM without performing active testing of a cell/site.

Existing solutions for determining interference include the following:

A) Determining statistical inference using measurements obtained from wireless network nodes can provide information that interference is present, but the determination is not specific to PIM.

B) Active testing using, for example, a radio frequency (RF) stress testing methodology for accurate and effective PIM interference.

C) On-site testing using commercially available PIM interference test equipment to test passive RF components at site.

D) Using a RF Spectrum Slope as an indication of a potential PIM interference issue.

E) On-site testing with equipment as described, for example, in U.S. Patent Publication No. US 2015/0350940, filed on May 27, 2015, which is incorporated by this reference in its entirety.

Problems with the above listed existing solutions include the following:

A) Detection of PIM interference using observational methods (i.e., statistical inference from measurements obtained from the wireless network nodes) does not allow the accurate differentiation of PIM interference from other types of interference. This often leads to an expensive investigative site visit to determine the actual cause of the interference and next actions to be taken in light of the interference.

B) RF stress testing relies on active testing where the cells at a site are monitored and then reconfigured to be stressed for a few minutes in order to reveal any PIM related issues on the uplink. Such active testing needs to be planned and managed carefully to minimize degradation to the network service. Additionally, approval from the customer to perform this test is typically required. For this reason, RF stress testing is usually performed during a maintenance window in the early hours of the morning. Due to the limited time for such testing, PIM interference caused due to heat stress at a later time during the day may be missed, thus, RF stress testing, which only provides a snapshot of PIM related issues and may incorrectly define dynamic PIM interference sources. Additionally, RF stress testing generally relies on proprietary base station features. Thus, existing methods for PIM interference detection is vendor specific.

C) On-site Testing requires actual visits by experienced technicians to the cell site with the required equipment. The cell site may be many hours' drive for the technician. An elevated work platform or a hydraulic crane with a railed platform (e.g., a Cherry Picker) is often required to perform the testing. Oftentimes cell outage is required to perform the testing. Sending a technician to the cell site for investigative purposes is therefore expensive. Sending a technician to fix an apparent PIM related fault which turns out to be an external interference source requires a second visit by the appropriate staff with equipment specific for that resolution. In some instances, a technician may be sent for on-site testing when the cause for the interference was a lack of capacity which could have been solved without a site visit. Accordingly, on-site testing is an expensive and inefficient option that does not scale to network wide PIM interference detection.

D) RF Spectrum Slope is the variation in amplitude of RF signals across a range of frequencies. Using the RF Spectrum Slope as an indication of potential PIM interference is based on the assumption that the main PIM interference signal is off channel (i.e. out of the uplink receive band) and relies on the amplitude slope that is in the uplink channel as the indicator of PIM interference. The amplitude slope can be caused by any other factors, such as interference from non-PIM sources and filter roll-off slope. Further, PIM interference can occur inband and so will have a peak and a positive and negative slope either side of the peak resulting in no consistent slope which could be used for detection.

E) The method described in the U.S. Patent Publication No. US 2015/0350940 utilizes actual on-site PIM detection measurements through equipment deployed at the site. The method described is completely remote from the site and uses existing performance metrics provided by an eNodeB (eNB) and radio network controllers (RNCs) and site configuration data from the operations support system (OSS).

As shown by the above noted problems with existing solutions, a solution is desired such that: (1) approval to test for detection purposes (i.e., active testing) is not required, (2) a site visit is not required, (3) continuous monitoring of cells is provided, and (4) active detection of PIM with limited staff involvement is provided.

Accordingly, to overcome at least some of the deficiencies of the prior art, in one aspect there is provided a method for determining whether a target cell has experienced PIM interference during a time window. The method includes defining a set of N time slices, each of the N time slices falling within the time window. The method includes obtaining, for each of the N time slices, a first performance metric, thereby obtaining a set of N first performance metrics. The method includes selecting a subset of the N time slices using the set of first performance metrics, said subset of the N time slices comprising a first time slice. The method includes determining, for the first time slice, at least a first data point using a performance metric for the target cell that was collected during the first time slice. The method includes using the first data point and a supervised learning model, determining whether the target cell has experienced PIM interference during the time window. In some embodiments, each of the N performance metrics indicates an amount of cell utilization and average interference during the corresponding time slice.

In some embodiment, the method includes the further step of obtaining, for each of the N time slices, a second performance metric, thereby obtaining a set of N second performance metrics. In such embodiments, the step of selecting the subset of the N time slices includes selecting the subset of the N time slices using the set of first performance metrics and the set of second performance metrics.

In some embodiments, the subset of the N time slices further includes a second time slice. In some embodiments, the method includes the further step of determining, for the second time slice, at least a second data point using a performance metric for the target cell that was collected during the second time slice. In such embodiments, the method includes using the first data point, the second data point, and the supervised learning model to determine whether the target cell has experienced PIM interference during the time window.

In some embodiments, the first data point is further determined using a performance metric collected during the first time slice for a cell co-sited with the target cell. In some embodiments, the first data point is further determined using a performance metric collected during the first time slice for a cell adjacent to the target cell.

In some embodiments, the method includes the further steps of inputting a first UL center frequency, a first UL frequency bandwidth, a first DL center frequency, and a first DL frequency bandwidth for the target cell into a PIM calculator; inputting at least a second DL center frequency and a second DL frequency bandwidth for the cell co-sited with the target cell into the PIM calculator; and obtaining a third data point from the PIM calculator. In such embodiments, the method include the further step of using the first data point, the second data point, the third data point and the supervised learning model to determine whether the target cell has experienced PIM interference during the time window.

In some embodiments, each of the first performance metric and the second performance metric is one of: long term evolution (LTE) uplink (UL) transmission time interval (TTI) utilization, LTE downlink (DL) TTI utilization, LTE data volume measure for DL, LTE data volume measure for UL, LTE average physical uplink shared channel (PUSCH) interference, LTE average physical resource block (PRB) utilization DL, LTE peak PRB utilization DL, LTE average scheduling entities (SE) per TTI DL, LTE average PRB utilization UL, LTE SE per TTI UL, Physical Uplink Control Channel (PUCCH) interference, PRB interference, and LTE UL data throughput In some embodiments, the step of determining the first data point includes determining an average interference power for each time slice included in said subset of the N time slices and calculating at least one of: i) the average of said determined averages, and ii) the variance of said determined averages. In some embodiments, each determined average interference power is one of: i) an average PUSCH interference power, and ii) an average PUCCH interference power.

In some embodiments, the step of determining the first data point includes adjusting the calculated average of said determined averages. In some embodiments, the step of determining the first data point includes calculating a difference between the determined average interference power and the calculated variance of said determined averages for each time slice included in said subset of the N time slices.

In some embodiments, the step of determining the first data point includes determining a PRB interference for each time slice included in said subset of the N time slices; determining a time slice of said subset of the N time slices comprising a maximum PRB interference; determining a time slice of said subset of the N time slices comprising a minimum PRB interference; calculating a PRB delta based on the maximum PRB interference and the minimum PRB interference; and calculating a difference between the determined average interference power and the calculated PRB delta for each time slice included in said subset of the N time slices.

In some embodiments, the step of determining the first data point includes determining a ratio of interference power in one or more PRBs of the PUCCH and interference power in one or more PRBs of the PUSCH for each time slice included in said subset of the N time slices. In some embodiments, the step of determining the first data point includes determining a ratio of DL data volume and DL TTI utilization for each time slice included in said subset of the N time slices. In some embodiments, the step of determining the first data point includes determining a transmission power rise in the cell co-sited with the target cell for each time slice included in said subset of N time slices and calculating a difference between the determined average interference power and the determined transmission power rise for each time slice included in said subset of N time slices.

In some embodiments, the step of determining the first data point includes determining an eightieth percentile of the determined average interference power and calculating a product of the determined eightieth percentile and a peak PRB usage for each time slice included in said subset of N time slices and calculating the variance of the calculated products. In some embodiments, the step of determining the first data point includes calculating a correlation of the determined average interference power and one of: (i) an average number of utilized DL scheduled entities and (ii) DL TTI utilization for each time slice included in said subset of N time slices.

In some embodiments, the step of determining the first data point includes performing a calculation based on the determined average interference power and an average interference power determined for the cell adjacent to the target cell for each time slice included in said subset of N time slices. In some embodiments, the step of determining the first data point includes calculating a PRB interference gradient for each time slice included in said subset of the N time slices.

In some embodiments, the step of determining, for each time slice included in said subset of the N times slices, the first data point includes determining an average interference for each of the PRBs of each time slice; determining a first average interference of a first subset of the PRBs of each time slice; determining a second average interference of a second subset of the PRBs of each time slice; and calculating a different between the first average interference and the second average interference.

In some embodiments, the first subset of the PRBs includes one of: (i) a first PRB, where the first PRB includes the highest average interference of the PRBs of each time slice, and (ii) the first PRB and a second PRB and where the second PRB includes the second highest average interference of the PRBs of each time slice. In some embodiments, the second subset of the PRBs includes nine PRBs, where the nine PRBs include the nine highest average interferences of the PRBs of each time slice.

In some embodiments, the method includes the further step of determining a delta between the first data point for the first time slice and the second data point for the second time slice. In some embodiments, each of the first data point and the second data point indicates one of: a tenth percentile LTE average PUSCH interference, a twentieth percentile LTE average PUSCH interference, an eightieth percentile LTE average PUSCH interference, a ninetieth percentile LTE average PUSCH interference, and a PRB interference, where the first time slice indicates a time slice of said subset of the N time slices comprising one of a maximum LTE average PUSCH interference and a second highest LTE average PUSCH interference and where the second time slice indicates a time slice of said subset of the N time slices comprising one of a minimum LTE average PUSCH interference, a third highest LTE average PUSCH interference, and a second lowest LTE average PUSCH interference. In some embodiments, each of the first data point and the second data point indicates a peak PRB usage, where the first time slice indicates a time slice of said subset of N time slices comprising a maximum LTE average PRB utilization DL and where the second time slice indicates a time slice of said subset of N time slices comprising a minimum LTE average PRB utilization DL.

Embodiments described above provide the following significant advantages. Embodiments described above use existing cellular radio network performance data and cell site configuration data. Such cellular radio network performance data and cell site configuration data is available from any cellular network equipment vendor. Accordingly, the embodiments may be used across multi-vendor networks. Embodiments do not require any network disruption and may be deployed without reliance on any apparatuses deployed in the cellular network or the networking affecting processes necessitated by such apparatuses. Embodiments allow continuous and accurate detection which leads to faster resolution of PIM related issues, thereby improving radio network quality and end-user experience. Embodiments reduce unnecessary site visits by detecting PIM interference from other forms of interference and prioritize rectification activities based on the severity and duration of the PIM interference. Embodiments may interwork with and complement existing tools such as an insight took kit (ITK), RF stress testing, a PIM and interference correction service (hereinafter referred to as "PIC" service) or other interference testing results. Embodiments provide a daily list of PIM affected cells.

BRIEF DESCRIPTION OF THE DRAWINGS

The accompanying drawings, which are incorporated herein and form part of the specification, illustrate various embodiments.

DETAILED DESCRIPTION

Figure 1:
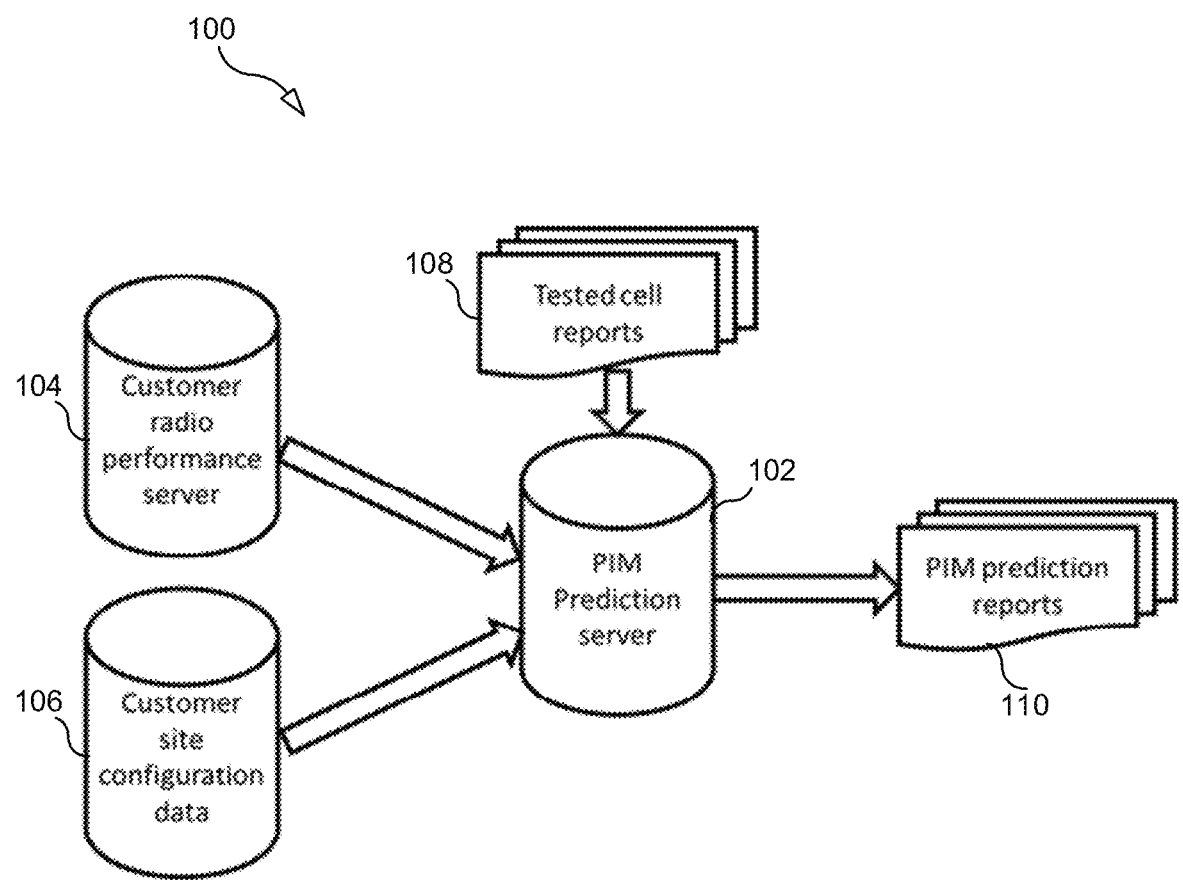
FIG. 1 illustrates a process using a machine learning algorithm according to some embodiments.

FIG. 1 illustrates a system 100 used to develop a Machine Learning algorithm (also referred to as a Machine Learning model) suitable for the prediction of PIM interference using tested cell results from active PIM measurements. As shown in FIG. 1, the system 100 comprises a PIM prediction server 102 configured to obtain data from a customer radio performance server 104, customer site configuration data 106, and tested cell reports 108 according to some embodiments. In some embodiments, the tested cell reports 108 may include active PIM measurements obtained from either the RF stress testing or onsite testing. In some embodiments, the PIM prediction server 102 generates one or more PIM prediction reports 110 to accurately detect cells with interference caused by PIM based on the obtained data from the customer radio performance server 104, the customer site configuration data 106, and the tested cell reports 108.

Figure 2:
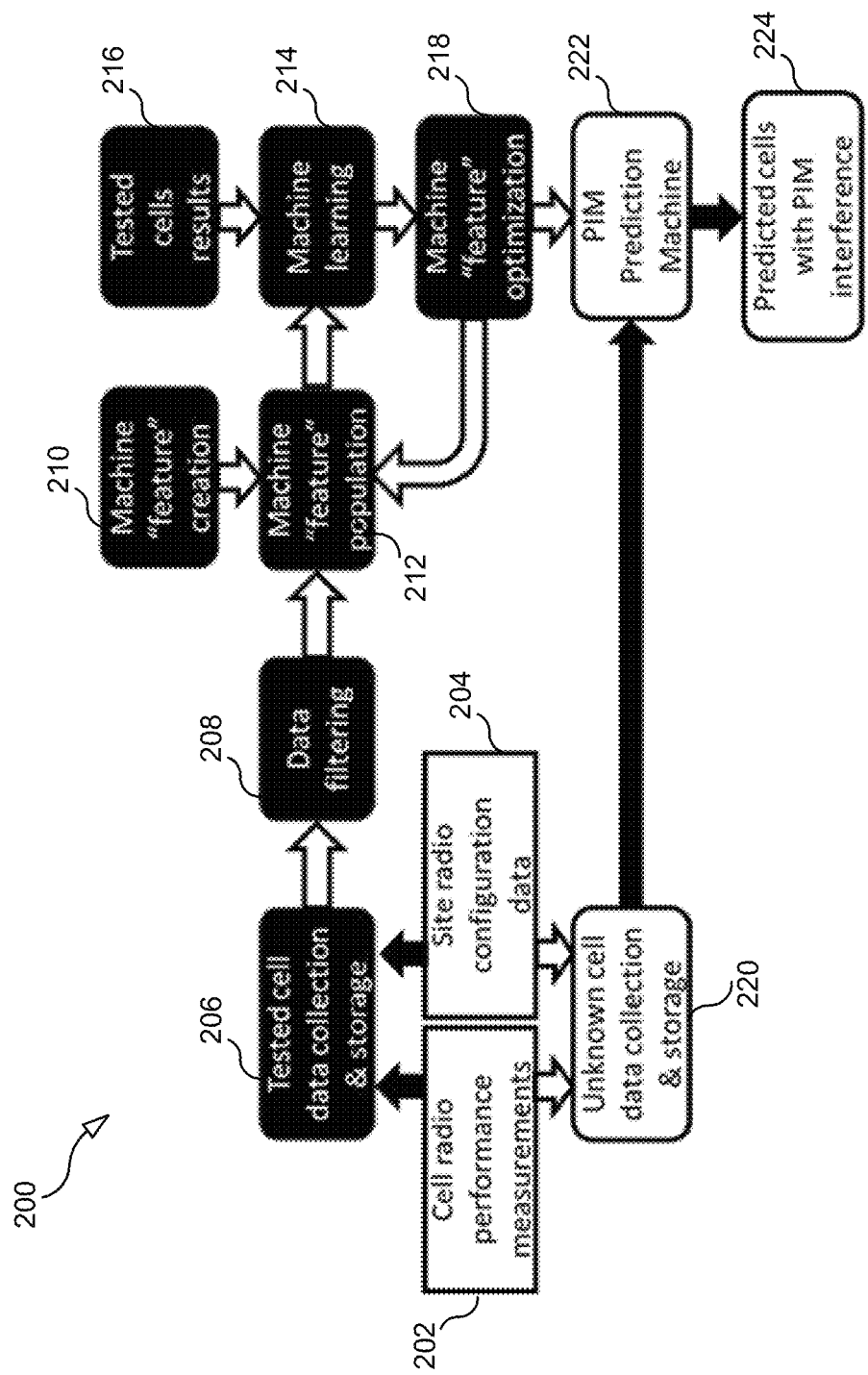
FIG. 2 is a flow chart illustrating a process according to one embodiment.

FIG. 2 illustrates a flow chart of an automated observational PIM detection process 200 according to some embodiments. This process 200 is used to develop the Machine Learning algorithm suitable for prediction of PIM interference using tested cell results from active PIM measurements.

The process 200 utilizes cell radio performance measurements and site radio configuration data in steps 202 and 204, respectively. In some embodiments, the cell radio performance measurements and site radio configuration data may be data from an ITK. In some embodiments, the cell radio performance measurements comprise (1) all uplink receive level measurements which may appear as receiver level (Rx Lev), received signal strength indicator (RSSI), received total wideband power (RTWP), wideband power, physical resource block (PRB) power, physical uplink shared channel (PUSCH) power, physical uplink control channel (PUCCH) power, and (2) traffic metrics which may include data volume, data throughput, number of connected users, number of active users, transmitter (Tx) power, PRB utilization, services requested, scheduling requests, and scheduling grants. In some embodiments, the site radio configuration data may comprise frequencies, bands, bandwidths, co-located cells and shared infrastructure, licenses and cell configuration data such as overhead channel setup, and maximum/minimum limits of configuration. In some embodiments, the process 200 uses a PIM prediction virtual machine and tested cell data results such as, for example, RF stress testing results. In some embodiments, active PIM measurements can be obtained from either the RF stress testing or onsite testing.

In some embodiments, the process 200 proceeds to step 206 in which tested cell data is collected and stored. In some embodiments, the cell level performance metrics are stored in a j son format. Each file contains the performance data from one cell for the duration of a collection interval, for example, 24 or 48 hours. The performance data from the cell is timestamped, where the timestamp refers to the coordinated universal time (UTC) collection time at the beginning of each collection period within the collection interval. For example, each collection period may be 15 minutes throughout a 48 hour collection interval. Accordingly, one j son file with 24 or 48 hours of data may have the data from 96 or 192 collection periods of 15 minutes (also referred to as result output periods (ROPs)). The cell radio performance measurements and the site radio configuration data for one cell obtained in steps 202 and 204 are also stored in the j son format. In some embodiments, the files containing cell radio performance measurements and the site radio configuration data are not timestamped.

In some embodiments, tested cell data is obtained from active testing results, such as RF stress testing results. In some embodiments, the RF stress testing provides results in the form of uplink interference level rise when downlink RF power is increased. This may not be available for some vendors. Accordingly, tested cell data may also be obtained from onsite testing and PIC service results. Onsite test results from PIM test equipment such as that from, for example, Kaelus may simply be a PIM level depicted in dBm or dBc.

The process 200 filters the collected data in step 208 according to some embodiments. During the data filtering step, the cell radio performance measurements and the site radio configuration data for each cell is combined into a per cell data structure. The data for each cell of interest (also referred to as a target cell) is combined with the data from co-sited cells. In some embodiments, the co-sited cells may be Wideband Code Division Multiple Access (WCDMA) or Long-Term Evolution (LTE) cells in any of the supported frequency bands.

In some embodiments, event data from each site is received and interrogated for times of performance affecting events at the site during the collection interval. The event data is received and interrogated to filter out data collected during time periods in which events may have affected the integrity of the data. Accordingly, the output from the data filtering step 208 is a set of performance and configuration data for each cell and its co-sited cells during the collection interval excluding data collected during any adverse events. In the context of the disclosure herein, this set of performance and configuration data output from the data filtering step 208 is referred to as "the complete dataset."

The process 200 creates machine features in step 210 according to some embodiments.

Machine features (hereinafter referred to as "features") are data points. A set of features may have a numeric characteristic that is different for cells with PIM interference compared to cells with no PIM interference or cells with interference of a different nature. In some embodiments, the numeric characteristic could be, for example, a data range that is different for data collected from cells with PIM interference. The complete dataset is subset, combined and transformed in different ways to create the features with significant numeric characteristics.

The features are created to emphasize aspects of interference that are (1) definitely not caused by PIM in the cases of narrowband interference or network traffic, and (2) those that are more likely to be PIM interference such as the slope of received level across the spectrum and correlation to transmit power. In some embodiments, the created features are based on a calculation of the likelihood of PIM interference from the site configuration data using existing PIM order calculations. In some embodiments, the created features are based on an aggregation of cell data into sector level data, for example, a total transmit power per band instead of per cell for that collection interval. In some embodiments, the features may be created based the importance of the collected data, which may vary depending on one or more performance metrics. As such, the features may be created based on collected data in view of one or more performance metrics. For example, features may be determined on data collected during the time of the highest or lowest traffic, highest or lowest uplink (UL) interference or combinations of several high or low performance metrics.

Some embodiments of methods used to subset, combine, and transform the complete dataset to create the features are described below.

One characteristic which distinguishes cells with PIM interference is that interference on the cell has different profiles during times of low and high cell utilization. To quantify such differences, data is selected from time periods at which each cell is at a high utilization and at a low utilization of a performance metric. Such selected time periods are referred to as "time slices" and data collected during the time slices is used to create the features according to some embodiments. The time slices are individually significant for each cell. That is, the time slices for minimum and maximum utilization for a particular performance metric will not necessarily be the same for different target cells.

Accordingly, LTE cell utilization can be measured in different ways. The exemplary embodiments described below may be used to select times of minimum and maximum utilization of a cell. In some embodiments, LTE PUSCH interference may be used as the performance metric to determine the time slices. In such embodiments, the time slices of $2^{nd}$ highest, $3^{rd}$ highest, and $2^{nd}$ lowest LTE Average interference are selected. In some embodiments, one or more of LTE Average PUSCH interference and LTE Percentile PUSCH interference may be used when the LTE PUSCH interference is being used as the performance metric. Similarly, when LTE UL Transmission Time Interval (TTI) utilization is used as the performance metric, the time slices of highest, $2^{nd}$ highest and minimum LTE TTI utilization are selected.

Accordingly, the following different data subsets, i.e. data collected during the time slices selected based on the following performance metrics, may be used for each cell: LTE UL TTI utilization (max, $2^{nd}$ highest and min), LTE downlink (DL) TTI utilization (max and min), LTE Data Volume measure for DL (max and min), LTE Data Volume measure for UL (max and min), LTE Average PUSCH interference (max, $2^{nd}$ highest, $3^{rd}$ highest, $2^{nd}$ lowest, min), LTE Average PRB utilization DL (max and min), LTE Average PRB utilization UL (max and min), LTE Av SE per TTI DL (max and min), LTE Av SE per TTI UL (max and min), PUCCH interference, PRB interference, and LTE UL data throughput.

The above noted different data subsets, i.e. the time slices, comprise all of the parameters from the complete dataset, but only at specific times from the collection period. These data subsets are then used to create the features, for example, by calculating the differences in the statistics between times of high and low cell utilization.

Examples of features created from the data subsets are provided below in Table 1.

TABLE 1

| | Feature Description (Calculated for each Target Cell) | Pseudo Formulae |
|---|---|---|
| 1 | Average of the Average PUSCH Interference Power in dB for each time period, averaged across all time periods. | Average($\mu_{PUSCH\_Interference}$) where: $\mu_{PUSCH\_Interference}$ is the Average PUSCH Interference Power in dB for each time period. |

TABLE 1-continued

| Feature Description (Calculated for each Target Cell) | | Pseudo Formulae |
|---|---|---|
| 2 | Variance of the Average PUSCH Interference Power in dB for each time period, across all time periods. | $\text{Var}(\mu_{PUSCH\_Interference})$<br>where:<br>$\mu_{PUSCH\_Interference}$ is the Average PUSCH Interference Power in dB for the Time Slice |
| 3 | Average of the PUCCH Interference Power in dB for each time period, averaged across all time periods. | $\mu_{PUCCH\_Interference}$<br>where:<br>$\mu_{PUSCH\_Interference}$ is the Average PUCCH Interference Power in dB for each time period. |
| 4a | Using the Time Slices for:<br>LTE Average PUSCH interference max<br>and<br>LTE Average PUSCH interference min<br>Calculate the delta between the two Timeslices for each of the values of:<br>$10^{th}$ Percentile PUSCH Interference level<br>$20^{th}$ Percentile PUSCH Interference level<br>$80^{th}$ Percentile PUSCH Interference level<br>$90^{th}$ Percentile PUSCH Interference level<br>PRB[n] Interference for all values of n | $\Delta(PUSCH_{Interference_{10thPercentile}})$<br>$= (PUSCH_{Interference_{10thPercentile}})_{TS1}$<br>$- (PUSCH_{Interference_{10thPercentile}})_{TS2}$<br>$\Delta(PUSCH_{Interference_{20thPercentile}})$<br>$= (PUSCH_{Interference_{20thPercentile}})_{TS1}$<br>$- (PUSCH_{Interference_{20thPercentile}})_{TS2}$<br>$\Delta(PUSCH_{Interference_{80thPercentile}})$<br>$= (PUSCH_{Interference_{80thPercentile}})_{TS1}$<br>$- (PUSCH_{Interference_{80thPercentile}})_{TS2}$<br>$\Delta(PUSCH_{Interference_{90thPercentile}})$<br>$= (PUSCH_{Interference_{90thPercentile}})_{TS1}$<br>$- (PUSCH_{Interference_{90thPercentile}})_{TS2}$<br>$\Delta(PRB_{Interference_n})$<br>$= (PRB_{Interference_n})_{TS1}$<br>$- (PRB_{Interference_n})_{TS2}$<br><br>where:<br>TS1 is the value in Time Slice for LTE Average PUSCH interference max<br>TS2 is the value in Time Slice for LTE Average PUSCH interference min |
| 4b | Using the Time Slices for:<br>LTE Average PUSCH interference $2^{nd}$ highest and<br>LTE Average PUSCH interference $3^{rd}$ highest<br>Calculate the delta between the two Timeslices for each of the values of:<br>$10^{th}$ Percentile PUSCH Interference level<br>$20^{th}$ Percentile PUSCH Interference level<br>$80^{th}$ Percentile PUSCH Interference level<br>$90^{th}$ Percentile PUSCH Interference level<br>PRB[n] Interference for all values of n | $\Delta(PUSCH_{Interference_{10thPercentile}})$<br>$= (PUSCH_{Interference_{10thPercentile}})_{TS1}$<br>$- (PUSCH_{Interference_{10thPercentile}})_{TS2}$<br>$\Delta(PUSCH_{Interference_{20thPercentile}})$<br>$= (PUSCH_{Interference_{20thPercentile}})_{TS1}$<br>$- (PUSCH_{Interference_{20thPercentile}})_{TS2}$<br>$\Delta(PUSCH_{Interference_{80thPercentile}})$<br>$= (PUSCH_{Interference_{80thPercentile}})_{TS1}$<br>$- (PUSCH_{Interference_{80thPercentile}})_{TS2}$<br>$\Delta(PUSCH_{Interference_{90thPercentile}})$<br>$= (PUSCH_{Interference_{90thPercentile}})_{TS1}$<br>$- (PUSCH_{Interference_{90thPercentile}})_{TS2}$<br>$\Delta(PRB_{Interference_n})$<br>$= (PRB_{Interference_n})_{TS1}$<br>$- (PRB_{Interference_n})_{TS2}$ |

TABLE 1-continued

| Feature Description (Calculated for each Target Cell) | Pseudo Formulae |
|---|---|
| | where:<br>TS1 is the value in Time Slice for LTE Average PUSCH interference $2^{nd}$ highest<br>TS2 is the value in Time Slice for LTE Average PUSCH interference $3^{rd}$ highest |
| 4c  Using the Time Slices for:<br>LTE Average PUSCH interference $2^{nd}$ highest andLTE Average PUSCH interference $2^{nd}$ lowest<br>Calculate the delta between the two Timeslices for each of the values of:<br>$10^{th}$ Percentile PUSCH Interference level<br>$20^{th}$ Percentile PUSCH Interference level<br>$80^{th}$ Percentile PUSCH Interference level<br>$90^{th}$ Percentile PUSCH Interference level<br>PRB[n] Interference for all values of n | $\Delta(\text{PUSCH}_{Interference_{10thPercentile}})$<br>$= (\text{PUSCH}_{Interference_{10thPercentile}})_{TS1}$<br>$- (\text{PUSCH}_{Interference_{10thPercentile}})_{TS2}$<br>$\Delta(\text{PUSCH}_{Interference_{20thPercentile}})$<br>$= (\text{PUSCH}_{Interference_{20thPercentile}})_{TS1}$<br>$- (\text{PUSCH}_{Interference_{20thPercentile}})_{TS2}$<br>$\Delta(\text{PUSCH}_{Interference_{80thPercentile}})$<br>$= (\text{PUSCH}_{Interference_{80thPercentile}})_{TS1}$<br>$- (\text{PUSCH}_{Interference_{80thPercentile}})_{TS2}$<br>$\Delta(\text{PUSCH}_{Interference_{90thPercentile}})$<br>$= (\text{PUSCH}_{Interference_{90thPercentile}})_{TS1}$<br>$- (\text{PUSCH}_{Interference_{90thPercentile}})_{TS2}$<br>$\Delta(\text{PRB}_{Interference_n})$<br>$= (\text{PRB}_{Interference_n})_{TS1}$<br>$- (\text{PRB}_{Interference_n})_{TS2}$ |
| | where:<br>TS1 is the value in Time Slice for LTE Average PUSCH interference $2^{nd}$ highest<br>TS2 is the value in Time Slice for LTE Average PUSCH interference $2^{nd}$ lowest |
| 5  Using the Time Slices for:<br>LTE Average PRB utilization DL max and<br>LTE Average PRB utilization DL min<br>Calculate the delta between the two Timeslices for the values of:<br>Peak PRB usage | $\Delta (\text{Max}(\text{PRB}_{Interference})) = (\text{Max}(\text{PRB}_{Interference}))_{TS1} - (\text{Max}(\text{PRB}_{Interference}))_{TS2}$<br>where:<br>TS1 is the value in Time Slice for LTE Average PRB utilization DL max<br>TS2 is the value in Time Slice for LTE Average PRB utilization DL min |
| 6a  For each of the Time Slices calculate:<br>The Ratio of received power in 1 or 2 PRB's in the PUCCH to received power in 1 or 2 PRB's in the PUCCH. Which PRB's and the number of PRBs are dependent on LTE channel bandwidth and PUCCH/IoT configuration of the network. This is calculated for both frequency ends of the channel where the PUCCH is allocated<br>Reasoning:<br>PIM detection through variation in uplink receive level. Low variation with "normal" receive interference levels indicates a clean (PIM free) cell. Low variation with "high" receive interference levels can indicate a constant form of interference (external radio or interference source) High variation can indicate PIM but other measures such as which PRBs are having high interference levels is also used to qualify PIM from other high interference variance causes | $\dfrac{\text{PRB}_{PUCCH}\text{Interference Power (dB)}}{\text{PRB}_{PUSCH}\text{Interference Power (dB)}}$<br><br>where:<br>$\text{PRB}_{PUCCH}$ is a PRB that falls within the PUCCH or IoT PUCCH<br>$\text{PRB}_{PUSCH}$ is a PRB that falls within the PUSCH |

TABLE 1-continued

| Feature Description (Calculated for each Target Cell) | Pseudo Formulae |
|---|---|
| 6b For each of the Time Slices calculate: The Ratio of PUCCH PRB Power in fW to PUSCH PRB Power in fW. 1 PRB is selected for each end of the LTE channel (where the PUCCH appears) for both the PUCCH and PUSCH PRBs. The actual PRB number chosen is dependent on the customer configuration of the LTE network (LTE channel width, IoT present, PUCCH dimensioning) | $\dfrac{PRB_{PUCCH} \text{Interference Power (fW)}}{PRB_{PUSCH} \text{Interference Power (fW)}}$ where: $PRB_{PUCCH}$ is a PRB that falls within the PUCCH or IoT PUCCH $PRB_{PUSCH}$ is a PRB that falls within the PUSCH |
| 7a For each of the Time Slices for LTE Average PUSCH interference (max, $2^{nd}$ highest, $3^{rd}$ highest, $2^{nd}$ lowest, min) calculate: The difference between Average of the PUSCH Interference in the Time Slice in dB and the Variance of the Average of the PUSCH Interference across all Time Intervals. | $\mu_{PUSCH\_Interference} - \text{Var}(\mu_{PUSCH\_Interference})$ where: $\mu_{PUSCH\_Interference}$ is the Average PUSCH Interference Power in dB for the Time Slice $\text{Var}(\mu_{PUSCH\_Interference})$ is the Variance of the Average of the PUSCH Interference across all Time Intervals. |
| 7b For each of the Time Slices calculate: Difference between Average of the PUSCH Interference in the Time Slice in dB and the Maximum of the PRB Interference Deltas in dB. | $\mu_{PUSCH\_Interference} - \text{Max}(\Delta(PRB_{Interference_n}))$ across all values of n where: $\mu_{PUSCH\_Interference}$ is the Average PUSCH Interference Power in dB for the Time Slice $\text{Max}(\Delta(PRB_{Interference_n}))$ is the Maximum of all the PRB Interference Deltas for all values of n: $\Delta(PRB_{Interference_n}) = \text{Max}(PRB_{Interference_n}) - \text{Min}(PRB_{Interference_n})$ which is the difference of Max and Min PRB Interference from all Time Slices, calculated for all values of n |
| 8 For Time of Maximum LTE Data Volume: Ratio of Downlink Data Volume (kB) in the Time Slice and the Downlink TTI Utilisation (%) in the Time Slice. | $\dfrac{\text{DL Data Volume (kB)}}{\text{DL TTI Utilisation (\%)}}$ where: DL Data Volume (kB) is the total data transmitted in the downlink for the Time Slice of Maximum Downlink Volume download. DL TTI Utilisation (%) is the % TTI used in the Downlink for the time period during the time period of Maximum Downlink Volume download |
| 9 For each of the Time Slices and each co-located WCDMA Cell calculate: Difference between the Average of the PUSCH Interference in dB in the Time Slice and WCDMA Transmitted Power Rise * 2.5 Reasoning: PIM detection from correlation of interference level with WCDMA transmit power of a co-located cells | $\mu_{PUSCH\_Interference} - 2.5 * (\text{WCDMA Tx Power} - \text{Min}(\text{WCDMA Tx Power})$ where: $\mu_{PUSCH\_Interference}$ is the Average PUSCH Interference Power in dB for the Time Slice WCDMA Tx Power is the Maximum WCDMA Cell Tx Power for the Time Slice Min(WCDMA Tx Power) is the minimum reported WCDMA Cell Tx Power level across all Time slices. |
| 10 For each of the Time Slices: Variance of the Product of $80^{th}$ Percentile PUSCH Interference level with Peak Power (PRB Utilization Peak) Reasoning: PRB utilization is used as a method of estimating DL transmit power. Peak DL power (PRB utilization peak) is more useful to find PIM as PIM interference increase at approximately a 3:1 ratio to transmit power causing it. | $\text{Var}\left(PUSCH_{Interference_{80thPercentile}} * 2^{\wedge}(-44)\right) - 121 - (10 * \log(\text{Peak PRBs Util} - 4)) * 2.7)$ where: $PUSCH\_Interference_{80th\_Percentile}$ is the 80th Percentile of the PUSCH Interference across the Cell PRBs in fW. Peak PRBs Util = Peak PRB Utilization, as a % of total PRBs, during the Time Slice |
| 11 For each of the Time Slices: Correlation of Average Interference in dB (Adjusted) Interference to Average Number of Utilized DL Scheduled Entities (Adjusted) Reasoning: PIM detection through correlation of interference level to DL Scheduled entities. When there are many users needing simultaneous downlink signals, there are more DL PRB's in use. This creates a wider | $\text{Corr}((10 * (\mu_{SSE\ per\ TTI\ DL} - 1), (\mu_{PUSCH_{Interference}} - 121))$ where: $\mu_{SE\ per\ TTI\ DL}$ is the Average DL SE Utilization in the Time Slice $\mu_{PUSCH\_Interference}$ is the Average PUSCH Interference Power in dB for the Time Slice |

TABLE 1-continued

| Feature Description (Calculated for each Target Cell) | Pseudo Formulae |
|---|---|
| downlink spectrum and higher total DL power which can both lead to higher interference received due to PIM | |
| 12 For each of the Time Slices: Correlation of Average Interference in dB (Adjusted) Interference to Downlink TTI Utilisation (%) in the Time Slice. Reasoning: PIM detection through correlation of interference level to TTI utilization. When there are many users needing service, there are more DL TTI's in use. This results in a higher average DL power over the ROP period which can be correlated to high average uplink interference over than ROP | $\text{Corr}\left((\mu_{PUSCH_{Interference}} - 121)/39, \text{DL TTI Utilisation}\right)$ where: $\mu_{PUSCH\_Interference}$ is the Average PUSCH Interference Power in dB for the Time Slice DL TTI Utilisation (%) is the % TTI used in the Downlink for the time period during the time period of Maximum Downlink Volume download |
| 13 For each of the Time Slices: Adjusted Average of the Average PUSCH Interference Power in dB for each time period, averaged across all time periods | $\text{Average}(\mu_{PUSCH_{Interference}}) + 117.5$ where: $\mu_{PUSCH\_Interference}$ is the Average PUSCH Interference Power in dB for each time period. |
| 14 For each of the Time Slices: Logical AND of the Average PUSCH Interference Power in dB (Adjusted) on the Target Cell with the Average PUSCH Interference Power in dB (Adjusted) on the adjacent LTE channel in the same band | $\text{AND}(\mu_{PUSCH_{Interference}}\_\text{TargetCell} + 117.5), (\mu_{PUSCH_{Interference}}\_\text{2ndCell} + 117.5)$ where: $\mu_{PUSCH_{Interference}}$_TargetCell is the Average PUSCH Interference Power in dB in the Target Cell for the Time Slice $\mu_{PUSCH_{Interference}}$_2ndCell is the Average PUSCH Interference Power in dB in the Cell in the 2$^{nd}$ Channel in the same 3GPP band for the Time Slice |
| 15 Calculation of the PRB Interference Gradient across Frequencies: Reasoning: PIM often does not fall in the middle of the uplink band, the interference can affect the higher frequencies more than the lower frequencies of the uplink (or vice versa). The Slope Detection feature looks to measure this slope (difference in received signal level) across the uplink frequency channel and flag if it is greater than a defined threshold | $\text{SLOPE}(PUSCH_{Interference}[PRB])$ where: $PUSCH_{Interference}[PRB]$ is the PUSCH Interference Power in dB per PRB during the Time Slice |
| 16a Narrowband Interference Detection is detected by reviewing interference at each PRB (180 kHz). Calculate the Difference between the Average Interference of the top 2 PRBs by Interference and the Average Interference of the top 9 PRBs by Interference in each Time Slice. Reasoning: If the average interference of the top 2 PRBs are 3 dB higher than the average of the top 9 PRBs, then the narrowband peak flag is raised. This feature highlights the presence of a single narrowband interferer which is much higher than any other narrowband interferer or wide band interferer. | $\left(\sum_{PRB=n}^{PRB=n+8} PUSCH_{Interference}[PRB]\right)/9 - \left(\sum_{PRB=n}^{PRB=n+1} PUSCH_{Interference}[PRB]\right)/2$ where: n is the Ordinal of the PRBs ranked from Highest to lowest Interference n = 1 is the PRB with the highest interference n + 1 is the PRB with the second highest interference n + 8 is the PRB with the 9th highest interference $PUSCH_{Interference}[PRB]$ is the PUSCH Interference Power in dB per PRB during the Time Slice |
| 16b Narrowband Interference detection is detected by reviewing interference at each PRB (180 kHz). Calculate the Difference between the Top PRB by Interference and the Average Interference of the top 9 PRBs by Interference in each Time Slice. Reasoning: A secondary search looks at PRBs in groups of 20 at a time, it then finds the highest PRB in the list of 20 PRBs and checks to see if that | $PUSCH_{Interference}[PRB = 1] - \left(\sum_{PRB=1}^{PRB=20} PUSCH_{Interference}[PRB]\right)/20$ where: n is the Ordinal of the PRBs ranked from Highest to lowest Interference n = 1 is the PRB with the highest interference $PUSCH_{Interference}[PRB]$ is the PUSCH Interference Power in dB per PRB during the Time Slice |

TABLE 1-continued

| | Feature Description (Calculated for each Target Cell) | Pseudo Formulae |
|---|---|---|
| | PRB is much higher than the average from that group, this finds any number of narrowband peaks that may appear throughout the spectrum. | |
| 17 | PIM Calculator Feature: The output of the PIM Calculator weighted to show configurations where the target cell is more likely to experience PIM interference. This is done through providing higher weighting to calculations where lower order PIM is possible and also to higher weight configurations where there is shared infrastructure such as the same antenna elements, same physical antenna and/or same coax feeders Calculation of the PIM Harmonic contribution from co-sited cells on frequency and band configuration of target and co-sited cells. For every cell to be predicted the corresponding neighbor cells in the same sector must be used in the PIM calculation. The universal Frequency Channel Numbers (FCN) must be converted to frequencies to perform the calculation. The corresponding bandwidths of each of the cells must also be considered for the calculation to determine whether the target cell is impacted. To simplify the calculation only specific harmonics are targeted (2 to 8). The harmonics have a direct relationship with the aggressor frequencies fo the neighbor cells. By limiting the coefficients which determine the order of the harmonics, the vectorized calculation is reduced. The calculation will make use of all the permutations of coefficients to determine if the resultant PIM product impacts, provided the permutation calculated an order between 1 and 8. The coefficient vectors are multiplied by the corresponding frequency list vector made up of the frequencies in target and aggressor cells. The bandwidth of the resulting product will be determined by the maximum bandwidth of all cells multiplied by the calculated order (as an approximation). All permutations of frequencies must also be created. The length of the frequency vectors much then be compared to the coefficients vectors so that vector multiplication can occur to determine the resultant frequency. The numerical spectrum parameters of the aggressor PIM is then calculated to finally determine if the PIM aggressor might impact the uplink band of the target cell. Each valid aggressor is then counted as an aggressor of its corresponding order. | Example code for Creation of large array of coefficient vectors Where "i" will determine the calculated orders of PIM. if i < 5: cooefListx1 = [−6, −5, −4, −3, −2, −1, 1, 2, 3, 4, 5, 6] + [−5, −4, −3, −2, −1, 1, 2, 3, 4, 5] + [−4, −3, −2, −1, 1, 2, 3, 4] + [−3, −2, −1, 1, 2, 3] cooefMix.append(list (itertools.permutations(cooefListx1,i))) if i >= 5: cooefListsm = [−6, −5, −4, −3, 3, 4, 5, 6] + [−4, −3, 3, 4] + [−2, 2] + [−1, 1] cooefMix.append(list (itertools.permutations(cooefListsm,i))) |
| 18 | Interference comparison deltas To distinguish interference that occurs during high traffic periods, time slices can be compared. For example, the wideband interference value from the highest interference time slice can be subtracted from wideband interference value from the lowest interference time slice to provide a value which can be used for comparison to other cells. The delta value is calculated between specific time slices which represent specific traffic conditions, and between aggregates of time slices to normalize anomalies | |
| 19 | Time slice comparison When the values of specific KPIs match in different time slices this indicates a characteristic that can be used to predict PIM. For example, the time slice for the highest | |

TABLE 1-continued

| Feature Description (Calculated for each Target Cell) | Pseudo Formulae |
|---|---|
| downlink throughput may be the same as the time slice for the highest interference value. | |
| 20 Traffic interference from interference To distinguish traffic from other forms of interference the PRB counters in the top and bottom parts of the spectrum can be used to measure PUCCH interference while the middle PRBs can be used to calculate PUSCH interference. Normally the difference groups of PRBs will either have similar lower interference levels, or a step change of interference between PUCCH and PUSCH. If the levels are high and similar this could indicate a PIM interference fault. Comparing the traffic interference metric across time slices improves the ability to distinguish between traffic interference and PIM interference. | |

The process 200 in step 212 adds the features created in step 210 to the complete dataset (also referred to as machine feature population). In some embodiments, the process 200 uses numerical definitions to calculate the features adds the features to the complete dataset.

The process 200 in step 214 trains a supervised learning predictive model on the complete dataset containing the cell radio performance measurements and the site radio configuration data together with the created features according to some embodiments. In some embodiments, tested cell results may be obtained in step 216. In such embodiments, the obtained tested cell results may be used to train the supervised learning predictive model. In some embodiments, the cell radio performance measurements and the site radio configuration data may be correlated with either a PIM interference level rise or a binary input indicating PIM interference or no PIM interference.

In some embodiments, the Machine Learning Model is a supervised learning SVM Machine with a Linear Kernel, which has proven to have good results on a PIM Radio Network dataset. In such embodiments, the SVM Machine is used to classify the interference profile of each cell in the dataset as being one of: "Clean," "Narrowband Interference," "Interference caused by network traffic" or "PIM Interference." In some embodiments, the SVM Machine uses the obtained tested cell results to learn how to weight and combine the data inputs to create a model which predicts the Interference Profile on each cell with the minimal errors.

The process 200 in step 218 compares the prediction results from the Machine Learning Model with the obtained tested cell results to determine incorrect predictions according to some embodiments. Incorrect predictions may be either False Positive where PIM is predicted on a cell which has no PIM interference or False Negative where no PIM is predicted on a cell when PIM interference actually exists. For both cases, the reasons for the incorrect predictions are analyzed in order to create new features or improve existing features. Accordingly, the coefficients of the Machine Learning Model are updated when the SVM Machine is trained with updated data and/or updated features, thereby optimizing the features.

The process 200 in step 222 uses the Predictive Model created through the PIM Machine Learning Model process 200 to predict cell interference by running the model on a new dataset of unknown cell data obtained in step 220. In some embodiments, the dataset of unknown cell data comprises cell radio performance measurements and site radio configuration data for one or more additional cells and features created using the method described herein. The output of step 222 is an interference profile for each cell which indicates whether each cell is predicted to be "clean," have "narrowband interference," "Interference caused by network traffic" or "PIM Interference."

The process 200 in step 224 compiles the list of cells from the PIM prediction machine for which PIM interference is predicted. This list allows network operators to investigate the listed cells and take the necessary actions to correct the underlying problems as required.

In some embodiments, any combination of the steps for the process 200 noted above may be performed. For example, the process 200 may include just steps 202, 204, 220, 222, and 224. As another example, steps 206, 208, 210, 212, 214, 216, and 218 may also be performed to enable the automated process 200 to detect PIM interference significantly faster and more accurately.

The features disclosed herein are created using combinations of the input data based on vast knowledge and experience regarding PIM interference through careful experimentation and optimization. The features disclosed herein have been tried, tested, and optimized to improve accuracy and precision of the machine. However, the disclosed features are not required, and any alternative or additional combination of the input data may be provided to create the features in some alternative embodiments.

Figure 3:
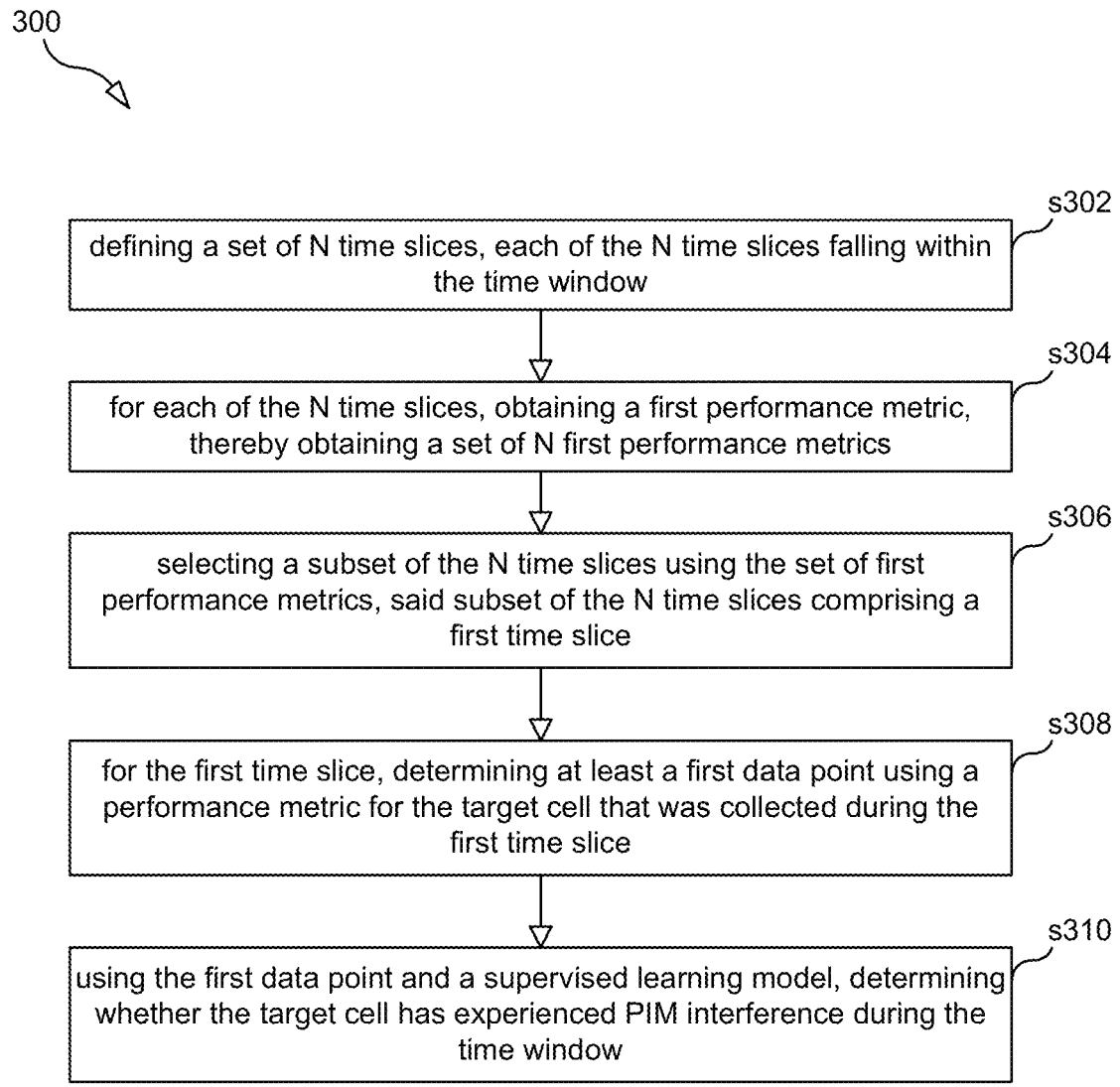
FIG. 3 is a flow chart illustrating a process according to one embodiment.

FIG. 3 is a flow chart illustrating a process 300, according to some embodiments, for determining whether a target cell has experienced PIM interference during a time window. Process 300 may begin with step s302 in which a set of N time slices is defined, where each of the N time slices fall within the time window. In step s304, a first performance metric is obtained for each of the N time slices, thereby obtaining a set of N first performance metrics. In step s306, a subset of the N time slices is selected using the set of first performance metric, said subset of the N time slices comprising a first time slice. In step s308, at least a first data point is determined for the first time slice using a performance metric for the target cell that was collected during the first time slice. In step s310, it is determined, using the first data point and a supervised learning model, whether the target cell has experience PIM interference during the time window. In some embodiments, each of the N performance metrics indicates an amount of cell utilization and average interference during the corresponding time slice.

In some embodiment, the process 300 includes the further step of obtaining, for each of the N time slices, a second performance metric, thereby obtaining a set of N second performance metrics. In such embodiments, the step of selecting the subset of the N time slices includes selecting the subset of the N time slices using the set of first performance metrics and the set of second performance metrics.

In some embodiments, the subset of the N time slices further includes a second time slice. In some embodiments, the process 300 includes the further step of determining, for the second time slice, at least a second data point using a performance metric for the target cell that was collected during the second time slice. In such embodiments, the process 300 includes using the first data point, the second data point, and the supervised learning model to determine whether the target cell has experienced PIM interference during the time window.

In some embodiments, the first data point is further determined using a performance metric collected during the first time slice for a cell co-sited with the target cell. In some embodiments, the first data point is further determined using a performance metric collected during the first time slice for a cell adjacent to the target cell.

In some embodiments, the process 300 includes the further steps of inputting a first UL center frequency, a first UL frequency bandwidth, a first DL center frequency, and a first DL frequency bandwidth for the target cell into a PIM calculator; inputting at least a second DL center frequency and a second DL frequency bandwidth for the cell co-sited with the target cell into the PIM calculator; and obtaining a third data point from the PIM calculator. In such embodiments, the process 300 includes the further step of using the first data point, the second data point, the third data point and the supervised learning model to determine whether the target cell has experienced PIM interference during the time window.

In some embodiments, each of the first performance metric and the second performance metric is one of: long term evolution (LTE) uplink (UL) transmission time interval (TTI) utilization, LTE downlink (DL) TTI utilization, LTE data volume measure for DL, LTE data volume measure for UL, LTE average physical uplink shared channel (PUSCH) interference, LTE average physical resource block (PRB) utilization DL, LTE peak PRB utilization DL, LTE average scheduling entities (SE) per TTI DL, LTE average PRB utilization UL, LTE SE per TTI UL, Physical Uplink Control Channel (PUCCH) interference, PRB interference, and LTE UL data throughput In some embodiments, the step of determining the first data point includes determining an average interference power for each time slice included in said subset of the N time slices and calculating at least one of: i) the average of said determined averages, and ii) the variance of said determined averages. In some embodiments, each determined average interference power is one of: i) an average PUSCH interference power, and ii) an average PUCCH interference power.

In some embodiments, the step of determining the first data point includes adjusting the calculated average of said determined averages. In some embodiments, the step of determining the first data point includes calculating a difference between the determined average interference power and the calculated variance of said determined averages for each time slice included in said subset of the N time slices. In some embodiments, the step of determining the first data point includes determining a PRB interference for each time slice included in said subset of the N time slices; determining a time slice of said subset of the N time slices comprising a maximum PRB interference; determining a time slice of said subset of the N time slices comprising a minimum PRB interference; calculating a PRB delta based on the maximum PRB interference and the minimum PRB interference; and calculating a difference between the determined average interference power and the calculated PRB delta for each time slice included in said subset of the N time slices.

In some embodiments, the step of determining the first data point includes determining a ratio of interference power in one or more PRBs of the PUCCH and interference power in one or more PRBs of the PUSCH for each time slice included in said subset of the N time slices. In some embodiments, the step of determining the first data point includes determining a ratio of DL data volume and DL TTI utilization for each time slice included in said subset of the N time slices. In some embodiments, the step of determining the first data point includes determining a transmission power rise in the cell co-sited with the target cell for each time slice included in said subset of N time slices and calculating a difference between the determined average interference power and the determined transmission power rise for each time slice included in said subset of N time slices.

In some embodiments, the step of determining the first data point includes determining an eightieth percentile of the determined average interference power and calculating a product of the determined eightieth percentile and a peak PRB usage for each time slice included in said subset of N time slices and calculating the variance of the calculated products. In some embodiments, the step of determining the first data point includes calculating a correlation of the determined average interference power and one of: (i) an average number of utilized DL scheduled entities and (ii) DL TTI utilization for each time slice included in said subset of N time slices.

In some embodiments, the step of determining the first data point includes performing a calculation based on the determined average interference power and an average interference power determined for the cell adjacent to the target cell for each time slice included in said subset of N time slices. In some embodiments, the step of determining the first data point includes calculating a PRB interference gradient for each time slice included in said subset of the N time slices.

In some embodiments, the step of determining, for each time slice included in said subset of the N times slices, the first data point includes determining an average interference for each of the PRBs of each time slice; determining a first average interference of a first subset of the PRBs of each time slice; determining a second average interference of a second subset of the PRBs of each time slice; and calculating a different between the first average interference and the second average interference.

In some embodiments, the first subset of the PRBs includes one of: (i) a first PRB, where the first PRB includes the highest average interference of the PRBs of each time slice, and (ii) the first PRB and a second PRB and where the second PRB includes the second highest average interference of the PRBs of each time slice. In some embodiments, the second subset of the PRBs includes nine PRBs, where the nine PRBs include the nine highest average interferences of the PRBs of each time slice.

In some embodiments, the process 300 includes the further step of determining a delta between the first data point for the first time slice and the second data point for the second time slice. In some embodiments, each of the first data point and the second data point indicates one of: a tenth percentile LTE average PUSCH interference, a twentieth percentile LTE average PUSCH interference, an eightieth percentile LTE average PUSCH interference, a ninetieth percentile LTE average PUSCH interference, and a PRB interference, where the first time slice indicates a time slice of said subset of the N time slices comprising one of a maximum LTE average PUSCH interference and a second highest LTE average PUSCH interference and where the second time slice indicates a time slice of said subset of the N time slices comprising one of a minimum LTE average PUSCH interference, a third highest LTE average PUSCH interference, and a second lowest LTE average PUSCH interference. In some embodiments, each of the first data point and the second data point indicates a peak PRB usage, where the first time slice indicates a time slice of said subset of N time slices comprising a maximum LTE average PRB utilization DL and where the second time slice indicates a time slice of said subset of N time slices comprising a minimum LTE average PRB utilization DL.

Figure 4:
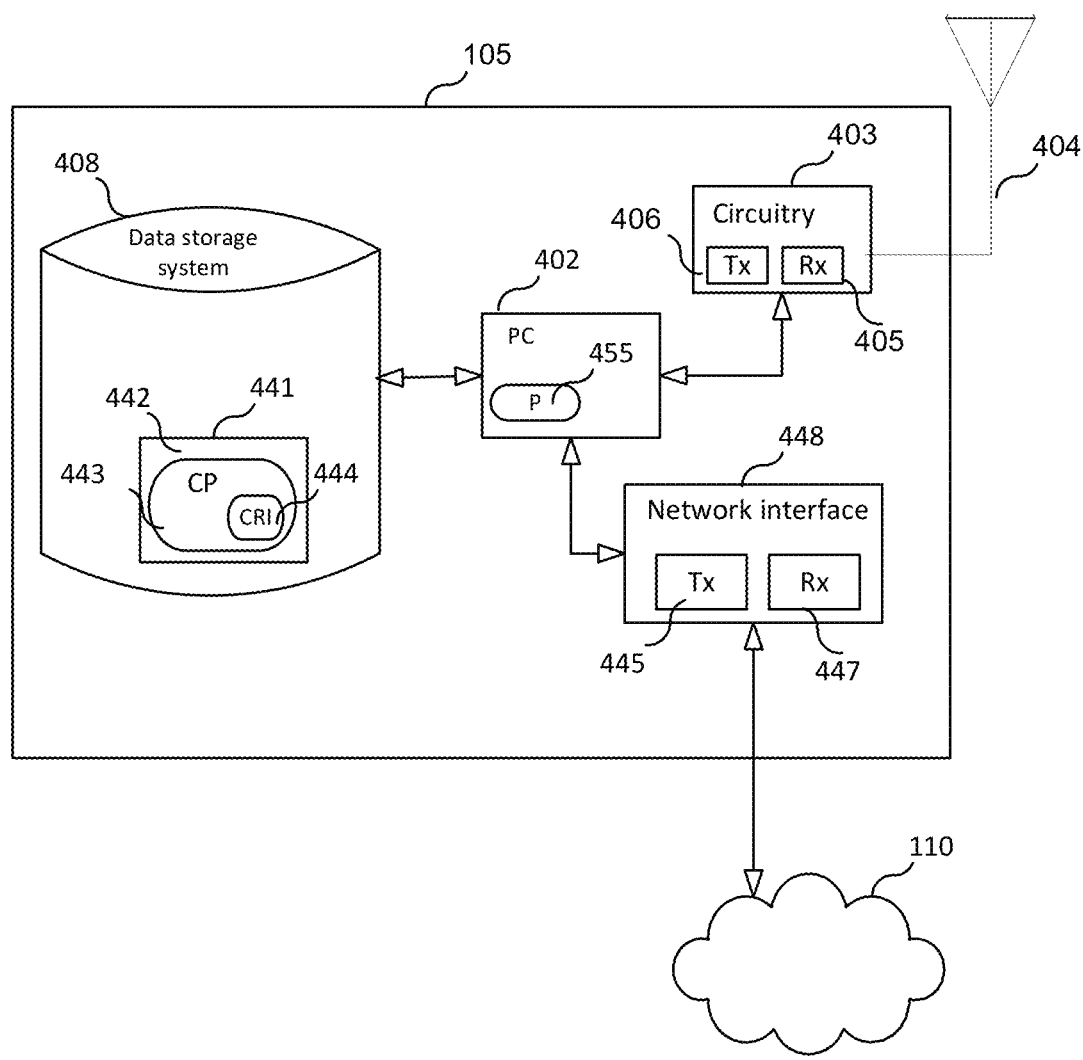
FIG. 4 is a block diagram of a network node according to one embodiment.

FIG. 4 is a block diagram of network node 105 (e.g., access point (AP) such as, for example, a 4G or 5G base station or other access point) according to some embodiments. As shown in FIG. 4, network node 105 may comprise: a processing circuit (PC) 402, which may include one or more processors (P) 455 (e.g., a general purpose microprocessor and/or one or more other processors, such as an application specific integrated circuit (ASIC), field-programmable gate arrays (FPGAs), and the like); a network interface 448 comprising a transmitter (Tx) 445 and a receiver (Rx) 447 for enabling network node 105 to transmit data to and receive data from other nodes connected to a network 110 (e.g., an Internet Protocol (IP) network) to which network interface 448 is connected; circuitry 403 (e.g., radio transceiver circuitry comprising an Rx 405 and a Tx 406) coupled to an antenna system 404 for wireless communication with UEs); and local storage unit (a.k.a., "data storage system") 408, which may include one or more non-volatile storage devices and/or one or more volatile storage devices (e.g., random access memory (RAM)). In embodiments where PC 402 includes a programmable processor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, but not limited, to magnetic media (e.g., a hard disk), optical media, memory devices (e.g., random access memory, flash memory), and the like. In some embodiments, the CRI 444 of computer program 443 is configured such that when executed by data processing apparatus 402, the CRI causes network node 105 to perform steps described herein (e.g., steps described herein with reference to the flow charts and/or message flow diagrams). In other embodiments, network node 105 may be configured to perform steps described herein without the need for code. That is, for example, PC 402 may consist merely of one or more ASICs. Hence, the features of the embodiments described herein may be implemented in hardware and/or software.

Figure 5:
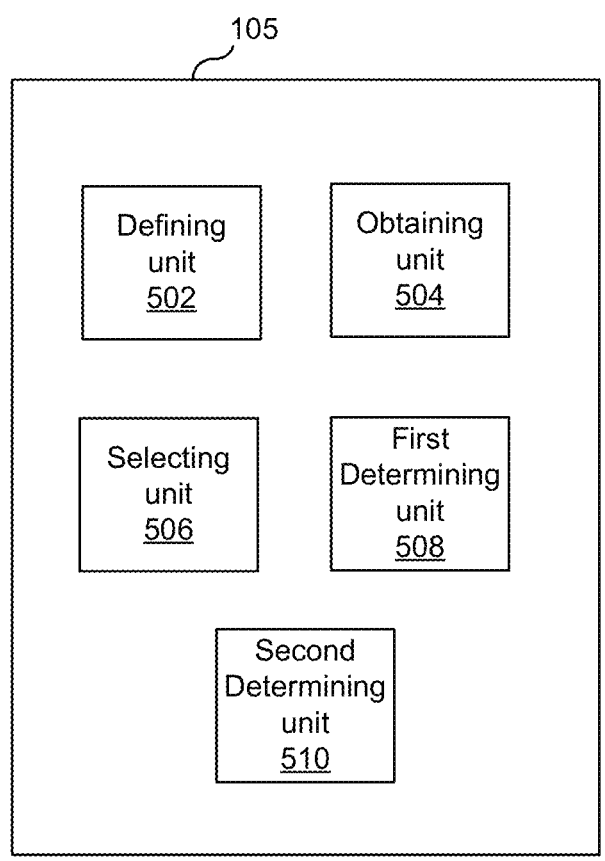
FIG. 5 is a diagram showing functional units of a network node according to one embodiment.

FIG. 5 is a diagram showing functional units of network node 105 according to some embodiments. As shown in FIG. 5, network node 105 includes a defining unit 502 for defining a set of N time slices, each of the N time slices falling within the time window; an obtaining unit 504 for obtaining a first performance metric for each of the N time slices, thereby obtaining a set of N first performance metrics; a selecting unit 506 for selecting a subset of the N time slices using the set of first performance metrics, said subset of the N time slices comprising a first time slice; a first determining unit 508 for determining, for the first time slice, at least a first data point using a performance metric for the target cell that was collected during the first time slice; and a second determining unit 510 for determining, using the first data point and a supervised learning model, whether the target cell has experienced PIM interference during the time window.

The embodiments described herein combine domain knowledge and machine-learning analytics techniques to automatically predict cells with interference due to Passive Intermodulation (PIM) distinguished from other forms of interference at cellular network sites. The list of cells from the PIM prediction machine for which PIM interference is predicted, as provided by the embodiments described herein, enables automated actions for mitigating such PIM interference and any related performance degradation.

The embodiments described herein provide significant advantages as described below:

1) Embodiments described herein do not require approval to test for detection purposes. Specifically, the use of existing performance and configuration data already collected in tools, such as an ITK and RF stress testing, in a purely monitoring type function ensures that there is no impact on the network. Accordingly, no work tickets or cell outage approvals are required.

2) Embodiments described herein do not require a site visit to detect PIM interference. An expensive site visit to either deploy PIM detection equipment or directly test for PIM faults to determine if interference is caused by PIM is not required. The embodiments use existing performance metrics and site data to predict PIM interference through a Machine Intelligence engine, thereby removing the need for physical visits to the site.

3) Embodiments described herein enable the continuous monitoring of thousands of cells. There currently does not exist an alarm or fault condition for PIM related issues. That is, conventional methods consider PIM as just one of many uplink interference sources. The rectification of PIM related issues, however, requires well-trained operators to visit the site and the use of specialized and expensive test equipment. Accordingly, the rectification of PIM related issues is expensive and, thus, reducing the resources spent training operators and the number of onsite PIM test equipment is important. For example, attending the site just once to resolve a PIM related issue rather than identifying and rectifying any PIM related issues over the course of multiple visits may reduce operational expenditures.

4) Embodiments described herein enable active detection of PIM interference with limited staff involvement. The embodiments described herein continuously monitors an entire network and makes predictions each day as to any cells suffering from PIM interference. The embodiments also effectively provide a pseudo alarm for PIM related issues without any personnel actions.

Features of the embodiments described herein include, but are not restricted to: (1) the ability to accurately predict a PIM related issue at a site based on existing radio performance and site configuration data; (2) continuously test and predict whether PIM related issues exist on thousands of cells each day; (3) no user action is required once setup; (4) distinguish PIM interference from other types of interference; and (5) provide a report and/or pseudo alarm for detected PIM related issues.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for determining whether a target cell has experienced passive intermodulation, PIM, interference during a time window, the method comprising:
defining a set of N time slices, each of the N time slices falling within the time window;
for each of the N time slices, obtaining a first performance metric, thereby obtaining a set of N first performance metrics;
selecting a subset of the N time slices using the set of N first performance metrics, said subset of the N time slices comprising a first time slice;
for the first time slice, determining a first data point based on one or more features evaluated using first data which represents at least one performance metrics related to the target cell, wherein the first data was collected during the first time slice;
using the first data point and a supervised learning model to determine whether the target cell has experienced a PIM interference during the time window.

2. The method of claim 1, wherein each of the N performance metrics indicates an amount of cell utilization and an average interference during a corresponding time slice.

3. The method of claim 1, further comprises:
for each of the N time slices, obtaining a second performance metric, thereby obtaining a set of N second performance metrics, and
the selecting of the subset of the N time slices uses the set of first N performance metrics and the set of N second performance metrics.

4. The method of claim 3, wherein each of the first performance metric and the second performance metric is one of: a long term evolution (LTE) uplink (UL) transmission time interval (TTI) utilization, an LTE downlink (DL) TTI utilization, an LTE data volume measure for DL, an LTE data volume measure for UL, an LTE average physical uplink shared channel (PUSCH) interference, an LTE average physical resource block (PRB) utilization DL, an LTE peak PRB utilization DL, an LTE average scheduling entities (SE) per TTI DL, an LTE average PRB utilization UL, an LTE SE per TTI UL, a Physical Uplink Control Channel (PUCCH) interference, an PRB interference, and an LTE UL data throughput.

5. The method of claim 1, wherein the subset of the N time slices further comprises a second time slice, the method further comprising:
for the second time slice, determining a second data point based on the one or more features evaluated using second data representing the at least one performance metrics related to the target cell, wherein the second data was collected during the second time slice, and the first data point, the second data point, and the supervised learning model are used to determine whether the target cell has experienced the PIM interference during the time window.

6. The method of claim 5, wherein the first data point is determined also using a performance metric collected during the first time slice for a cell co-sited with the target cell.

7. The method of claim 6, wherein the method further comprises:
inputting a first UL center frequency, a first UL frequency bandwidth, a first DL center frequency, and a first DL frequency bandwidth for the target cell into a PIM calculator;
inputting at least a second DL center frequency and a second DL frequency bandwidth for the cell co-sited with the target cell into the PIM calculator; and
obtaining a third data point from the PIM calculator.

8. The method of claim 7, wherein the first data point, the second data point, the third data point and the supervised learning model are used to determine whether the target cell has experienced the PIM interference during the time window.

9. The method of claim 1, wherein the first data point is determined using also a performance metric collected during the first time slice for a cell adjacent to the target cell.

10. The method of claim 1, wherein determining the first data point comprises:
for each time slice included in said subset of the N time slices, determining an average interference power; and
calculating at least one of: i) an average of said determined averages, and ii) a variance of said determined averages.

11. The method of claim 10, wherein each determined average interference power is one of: i) an average PUSCH interference power, and ii) an average PUCCH interference power.

12. The method of claim 10, wherein determining the first data point further comprises:
adjusting the calculated average of said determined averages.

13. The method of claim 10, wherein determining the first data point further comprises:
for each time slice included in said subset of the N time slices, calculating a difference between the determined average interference power and the calculated variance of said determined averages.

14. The method of claim 10, wherein determining the first data point further comprises:
for each time slice included in said subset of the N time slices, determining a physical resource block, PRB, interference;
determining a time slice of said subset of the N time slices comprising a maximum PRB interference;
determining a time slice of said subset of the N time slices comprising a minimum PRB interference;
calculating a PRB delta based on the maximum PRB interference and the minimum PRB interference; and
for each time slice included in said subset of the N time slices, calculating a difference between the determined average interference power and the calculated PRB delta.

15. The method of claim 10, wherein determining the first data point further comprises:
for each time slice included in said subset of N time slices, determining a transmission power rise in the cell co-sited with the target cell; and for each time slice included in said subset of N time slices, calculating a difference between the determined average interference power and the determined transmission power rise.

16. The method of claim 10, wherein determining the first data point further comprises:
for each time slice included in said subset of N time slices, determining an eightieth percentile of the determined average interference power and calculating a product of the determined eightieth percentile and a peak physical resource block, PRB, usage; and
calculating the variance of the calculated products.

17. The method of claim 1, wherein determining the first data point comprises:
for each time slice included in said subset of the N time slices, determining a ratio of an interference power in one or more physical resource blocks, PRBs, of a physical uplink control channel, PUCCH, and an interference power in one or more PRBs of a physical uplink shared channel, PUSCH.

18. The method of claim 1, wherein determining the first data point comprises:
for each time slice included in said subset of the N time slices, determining a ratio of downlink, DL, data volume and DL transmission time interval, TTI, utilization.

19. A network node, the network node being adapted to:
define a set of N time slices, each of the N time slices falling within a time window;
for each of the N time slices, obtain a first performance metric, thereby obtaining a set of N first performance metrics;
select a subset of the N time slices using the set of N first performance metrics, said subset of the N time slices comprising a first time slice;
for the first time slice, determine a first data point based on one or more features evaluated using data representing at least one performance metrics related to the target cell, wherein the data was collected during the first time slice;
using the first data point and a supervised learning model to determine whether the target cell has experienced a passive intermodulation, PIM, interference during the time window.

20. A network node, the network node comprising:
a defining unit for defining a set of N time slices, each of the N time slices falling within the time window;
an obtaining unit for obtaining, for each of the N time slices, a first performance metric, thereby obtaining a set of N first performance metrics;
a selecting unit for selecting a subset of the N time slices using the set of N first performance metrics, said subset of the N time slices including a first time slice;
a first determining unit for determining, for the first time slice, a first data point based on one or more features evaluated using data representing at least one performance metrics related to the target cell, wherein the data was collected during the first time slice;
a second determining unit for determining, using the first data point and a supervised learning model, whether the target cell has experienced a passive intermodulation, PIM, interference during the time window.

* * * * *